(12) United States Patent
Seibel et al.

(10) Patent No.: US 10,654,024 B2
(45) Date of Patent: May 19, 2020

(54) RHO ZEOLITES AND METHOD OF MAKING THE SAME

(71) Applicant: Air Products and Chemicals, Inc., Allentown, PA (US)

(72) Inventors: Elizabeth M. Seibel, White Haven, PA (US); William Jack Casteel, Jr., Fountain Hill, PA (US); Garret Chi-Ho Lau, New Tripoli, PA (US); Roger Dean Whitley, Allentown, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 16/145,770

(22) Filed: Sep. 28, 2018

(65) Prior Publication Data

US 2020/0101438 A1    Apr. 2, 2020

(51) Int. Cl.
| | |
|---|---|
| *C01B 39/46* | (2006.01) |
| *B01J 20/18* | (2006.01) |
| *B01J 20/30* | (2006.01) |
| *C01B 39/02* | (2006.01) |
| *B01J 20/28* | (2006.01) |

(52) U.S. Cl.
CPC ............ *B01J 20/18* (2013.01); *B01J 20/186* (2013.01); *B01J 20/28095* (2013.01); *B01J 20/3085* (2013.01); *C01B 39/026* (2013.01); *C01B 39/46* (2013.01)

(58) Field of Classification Search
CPC ........ C01B 39/026; C01B 39/46; B01J 20/18; B01J 20/186; B01J 20/28095
See application file for complete search history.

(56) References Cited

U.S. PATENT DOCUMENTS

| | | | |
|---|---|---|---|
| 3,720,750 A | * | 3/1973 | Wiewiorowski et al. ................... C22B 23/0492 423/150.5 |
| 3,904,738 A | | 9/1975 | Robson |
| 4,806,689 A | * | 2/1989 | Gier .............................. 564/474 |
| 5,294,418 A | | 3/1994 | Ramprasad et al. |
| 5,730,003 A | | 3/1998 | Nguyen et al. |
| 5,944,876 A | | 8/1999 | Corbin et al. |
| 7,169,212 B1 | | 1/2007 | Corbin |

OTHER PUBLICATIONS

Corbin, D.R. et al; "Flexibility of the Zeolite RHO Framework In Situ x-ray and Neutron Powder Structural Characterization of Divalent Cation-Exchanged Zeolite RHO"; Journal of the American Chemical Society, (1990); vol. 112; Issue 12; pp. 4821-4830.

(Continued)

*Primary Examiner* — David M Brunsman
(74) *Attorney, Agent, or Firm* — Matthew R. Weaver

(57) ABSTRACT

Disclosed are novel, as-crystallized RHO zeolite compositions with improved uniformity in morphology. These RHO compositions are useful for preparing cation-exchanged RHO zeolites that can be used as adsorbents for oxygen and/or nitrogen with improved properties. The adsorbents can be used in pressure swing adsorption processes for selectively adsorbing oxygen and/or nitrogen from feed streams such as an air stream or crude argon stream. Also disclosed are novel methods of preparing RHO zeolites with improved morphology control.

13 Claims, 1 Drawing Sheet

(56) References Cited

OTHER PUBLICATIONS

Mousavi, Saved Foad et al; "Template Free Crystallization of Zeolite Rhovia Hydrothermal Synthesis:Effects of synthesis time, synthesis temperature, water content and alkalinity" Ceramics International 39 (2013); pp. 7149-7158.

Lozinska, Magdalena, et al; "Understanding Carbon Dioxide Adsorption on Univalent Cation Forms of the Flexible Zeolite Rho at Conditions Relevant to Carbon Capture from Flue Gases"; Journal of American Chemical Society, (2012), vol. 134; Issue 42; pp. 17628-17642.

Lozinska et al., "Cation Control of Molecular Sieving by Flexible Li-Containing Zeolite Rho," J. Phys. Chem. C, 2016, 120, 19652-19662.

Lozinska, et al, U.S. Appl. No. 15/718,467, filed Sep. 28, 2017, 64 pgs.

Shadra, et al, U.S. Appl. No. 15/718,620, filed Sep. 28, 2017, 58 pgs.

Man, Park, et al; "Synthesis of Zeolite Rho: Aging Temperature Effect"; Journal of Pourous Materials 3, (1996); pp. 151-155.

Lapshin, A.E., et al; "Distribution of Extra-Framework Cations and Water Molecules in Synthetic High-Silica (Na, Cs)-Rho-Zeolite" Glass Physics and Chemistry vol. 39 (2013); pp. 420-424.

Johnson, Geoffrey, et al; "Flexibility and Cation Distribution upon Lithium Exchange of Aluminosilicate and Aluminogermanate Materials with the RHO Topology"; American Chemical Society (1999); pp. 2780-2787.

EPC Search Report, EPC 19198962.3; dated Dec. 12, 2019; 13 pgs.

\* cited by examiner

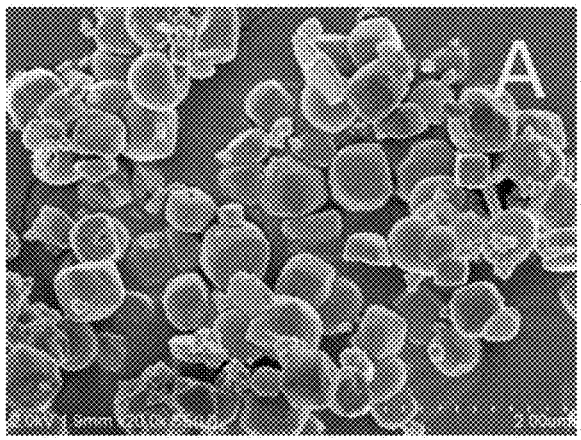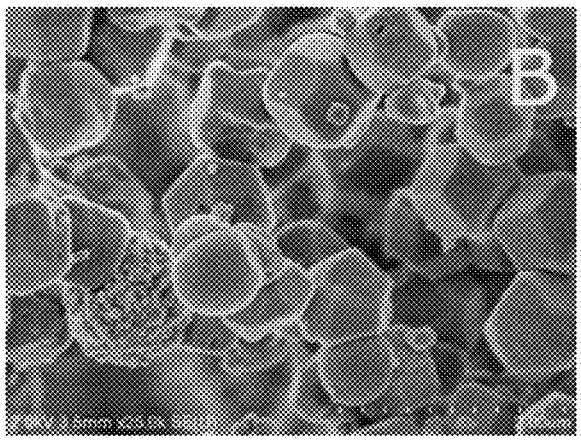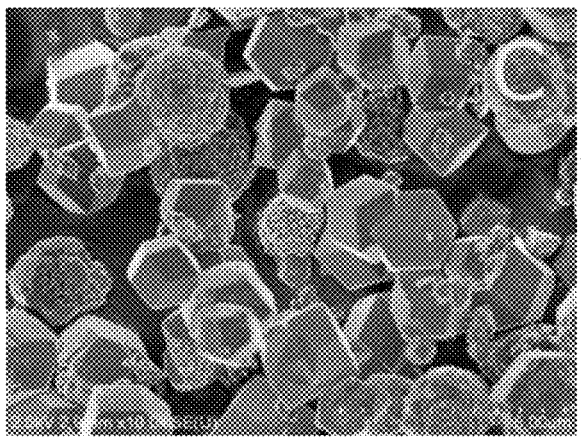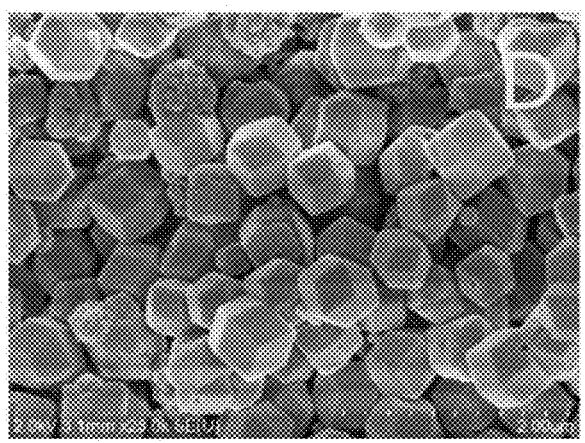

RHO ZEOLITES AND METHOD OF MAKING THE SAME

BACKGROUND

This disclosure relates to as-crystallized zeolite compositions of the RHO-type (hereinafter referred to as RHO zeolites), ion-exchanged RHO zeolites made from said as-crystallized RHO zeolites, and methods of making the same. The ion-exchanged RHO zeolites disclosed herein are useful as adsorbents in various applications, such as for kinetically separating oxygen from oxygen-containing streams such as for purifying crude argon, for separating nitrogen from air, for removal of trace $N_2$ from argon, and/or for removal of $CO_2$ from methane. In particular, disclosed herein are as-crystallized RHO(3.1-3.6) zeolite compositions with improved morphology that can be ion-exchanged and used as adsorbent compositions, and methods of making the same.

In the industrial gas production industry, there is a need to efficiently separate oxygen from oxygen-containing streams at ambient or sub-ambient temperatures.

In cryogenic air separation, nitrogen ($N_2$), oxygen ($O_2$), and argon (Ar) are separated based on their boiling points and relative volatilities. A first cryogenic column provides a rough separation of the three main components of air: $N_2$ (78%), $O_2$ (21%), and Ar (1%). A side stream is removed and sent to a second column known as the side arm column or crude argon column. This stream is called "crude" because it exits this side arm column at only about 95% argon. The conventional methods for further purifying this crude argon are limited to: "Deoxo" purification, getter bed technologies, and additional distillation. The Deoxo process reacts controlled amounts of hydrogen with the oxygen in the argon stream to form water, which is more easily removed from the stream. Because the reaction of hydrogen and oxygen generates significant heat, this process can be dangerous if not controlled properly. Getter beds only function at lower oxygen concentrations by reacting oxygen with copper catalyst to form copper oxide. When high purity argon is desired, a third distillation column can be used to further concentrate it. Unfortunately, these distillation columns require upwards of 200 stages due to the similarity in boiling points of $O_2$ and Ar and are less economical than is desired.

Compared to the conventional, very elaborate methods of recovering argon from a crude argon stream, a PSA (pressure swing adsorption) process provides a simple and effective alternative for argon purification and recovery. No hydrogen or additional cryogenic stages are required.

However, to achieve a kinetic or adsorption rate-dependent separation of $O_2$ from either $N_2$ or Ar by an adsorption mechanism, an adsorbent structure must be developed with very specific pore dimensions. The Lennard-Jones 6-12 kinetic diameter of Ar (3.40 Å) is smaller than that of $O_2$ (3.46 Å), but $O_2$ is not a spherical molecule and has a minimum molecular dimension that could be exploited. The symbol Å represents the Angstrom, a unit of length, which is defined as $10^{-10}$ meters. Adsorption mechanisms suggest that the minimum molecular dimension is the limiting factor for kinetic exclusion. With the proper orientation, $O_2$ should diffuse into a pore with an effective diameter of 2.8 Å. Argon, a spherical atom, will have a constant diameter of 3.4 Å. This 0.6 Å difference in diameters is the key sensitivity that an $O_2$ selective adsorbent must demonstrate to achieve a kinetic separation between oxygen and argon. With such an adsorbent, a process could be derived that purifies crude argon from the cryogenic air separation process in a safer and more economical manner and removes $O_2$ from argon much more rapidly and efficiently.

U.S. Pat. No. 5,730,003 describes a hybrid process where crude argon produced in a cryogenic distillation plant is processed in a 2-bed pressure swing adsorption (PSA) unit to produce 99.999% argon. If the crude argon contains significant amount of nitrogen in addition to oxygen, the patent reports to include a nitrogen selective adsorbent in a layer separate from the oxygen selective layer. Carbon molecular sieve (CMS), type A zeolite, clinoptilolite, and the adsorbents disclosed in U.S. Pat. No. 5,294,418 are used as an oxygen selective layer. As a nitrogen selective layer, adsorbents such as CaA, type X zeolite (LiX or NaX), and zeolite of type A & X containing mixed cations selected from groups I and II of the periodic table (LiNaX) are mentioned.

U.S. patent application Ser. No. 15/718,467, RHO ADSORBENT COMPOSITIONS, METHODS OF MAKING, AND USING THEM, and Ser. No. 15/718,620, PROCESSES USING IMPROVED RHO ADSORBENT COMPOSITIONS (the contents of which are incorporated herein by reference), describe novel RHO zeolite compositions, as well as previously described RHO zeolite compositions, and their application to PSA processes and specifically PSA processes for the removal of oxygen from oxygen-containing fluid streams.

A RHO zeolite has a symmetric, three-dimensional pore structure containing channels with openings made up of two, 8-membered oxygen rings, and in the as-crystallized form contains sodium and cesium cations. The nominal ring diameter or opening is 3.6 Å. This is close to the target pore dimensions, mentioned above, for the kinetic separation of $O_2$ from Ar and $N_2$, and $N_2$ from Ar vide supra. This pore dimension could also be useful in the separation of $CO_2$ from methane.

The as-prepared, hydrated, RHO zeolites crystallize with a centrosymmetric body centered cubic (bcc) structure, but it has been shown that this structure can undergo rather large distortions to lower symmetry upon dehydration and if subjected to certain types of extra-framework cation substitution. The distortion, which can be observed as a large unit cell contraction, is largely driven by the distortion of the RHO 8-rings. Corbin and coworkers have shown that the undistorted, essentially circular rings of the proton-exchanged RHO can distort to highly elliptical rings on exchange of small, high charge density cations such as $Ca^{2+}$ and $Li^+$ (*Journal of the American Chemical Society*, 1990, 112, 4821).

RHO zeolites require the presence of large cesium extra-framework cations as the structure directing agent during synthesis, and do not occur naturally. They were first prepared in 1973 by Robson and coworkers (*Advances in Chemistry Series*, 1973, 121, 106.). This initial synthesis used no additional organic templating agents and produced RHO materials with a ratio of Si to Al atoms equal to 3.1 to 3.2, hereafter specified by the shorthand RHO(3.1) to RHO(3.2). Unfortunately, the template-free method of Robson has proven somewhat unreliable, often producing mixtures of RHO and other cesium-containing phases, such as pollucite, as well as a mixture of crystalline morphologies and particle sizes.

Corbin and coworkers (*Journal of the American Chemical Society*, 1990, 112, 4821) describe a modified, template-free synthesis of NaCsRHO(3.2), which uses a soluble alumina source, sodium aluminate, and somewhat higher water content. This method more reliably produces pure zeolite RHO than the method of Robson vide supra, but the present inventors have found that it still leads to mixed RHO morphology phases. Moreover, the present inventors have found that these mixed morphology phases persist through subsequent ion exchange processes such as those required to make the ion-exchanged RHO compositions described in U.S. patent application Ser. No. 15/718,467, RHO ADSORBENT COMPOSITIONS, METHODS OF MAKING, AND USING THEM, and Ser. No. 15/718,620, PROCESSES USING IMPROVED RHO ADSORBENT COMPOSITIONS (discussed supra), and that said mixed morphology phases have an adverse effect on the adsorption properties of the ion-exchanged RHO zeolite.

The presence of RHO of mixed morphologies from these existing NaCsRHO(3.2) crystallization routes was explored more fully by Mousavi and coworkers (Mousavi, S. F. et. al, Ceramics International, 2013, 39, 7149). They evaluated the effects of crystallization time, synthesis temperature, water content, and alkalinity during synthesis on the resulting NaCsRHO(3.2) particle shape and size. Though not explicitly cited, the authors follow a synthesis recipe found in Robson (U.S. Pat. No. 7,169,212). It was shown by microscopy studies in this study that RHO(3.2) naturally crystallizes concurrently in two different particle morphologies: 1) polyhedral crystallites of presumably uniform density and 2) polycrystalline aggregates of roughly the same overall size but composed of many small crystallites grown together. X-ray diffraction data presented in the study indicates uniform NaCsRHO(3.2), from which will be understood by those skilled in the art that both particle morphologies are RHO(3.2) with the same chemical composition, within the detection limits of XRD.

The present inventors have found that the presence of impurity phases in and even multiple morphology phases in the, as-crystallized, pure NaCsRHO(3.2), make the attainment of consistent and uniform adsorption properties in subsequent ion-exchanged RHO forms difficult.

More recently, RHO zeolites have been synthesized by Chatelain and coworkers using 18-crown-6 as a templating agent (*Microporous Materials*, 1995, 4, 231). The templated method more reliably gives highly crystalline NaCsRHO with Si/Al=3.9 to 4.5, i.e., RHO(3.9) to RHO(4.5), and very uniform particle sizes and morphologies, but is challenged commercially by the high cost of the 18-crown-6 templating agent and the added unit operation and difficulty fully removing the templating agent by calcination at high temperature.

Accordingly, there remains a need in the art for as-crystallized RHO(3.1-3.6) zeolites of consistently high purity with uniform particle sizes and morphologies, and for organic-template-free methods for producing the such zeolites, which zeolites can then be ion-exchanged (as for example described in U.S. patent application Ser. Nos. 15/718,467 and 15/718,620, discussed supra) to provide improved adsorbents that are particularly suited for the separation of $O_2$ from mixtures containing $N_2$ and/or Ar.

BRIEF SUMMARY

Disclosed herein are as-crystallized NaCsRHO (3.1-3.6) zeolites having a morphology wherein a large amount of the zeolite is in the form of polyhedral crystallites and at most only a small amount of the zeolite is in the form of polycrystalline aggregates. The present inventors have found that the extent to which the as-crystallized RHO zeolite is in the form of polyhedral crystallites (as opposed to polycrystalline aggregates) can be assessed indirectly by measuring the $O_2$ adsorption capacity of the as-crystallized zeolite. More specifically, the greater the fraction of the zeolite is that is in the form of polyhedral crystallites, the lower the $O_2$ adsorption capacity of the zeolite will be.

In particular, disclosed herein are as-crystallized NaCsRHO (3.1-3.6) zeolites that have an $O_2$ adsorption capacity of less than 0.015 mmol/g as measured by single point isotherm for $O_2$. The inventors have found that such zeolites provide a superior starting point for preparing ion-exchanged RHO (3.1-3.6) zeolites for use as adsorbents in PSA and other adsorption processes, and in particular for use as kinetically selective adsorbents for adsorbing and separating oxygen from gas mixtures containing other gases (such as nitrogen and/or argon).

Also disclosed herein are ion-exchanged RHO zeolites prepared from the aforementioned as-crystallized RHO zeolites. In particular, disclosed herein are ion-exchanged RHO zeolites that constitute preferred adsorbents for use in adsorption processes as referred to above.

Also disclosed herein are methods of making the aforementioned as-crystallized RHO zeolites and ion-exchanged RHO zeolites. In particular, disclosed herein are methods for making such zeolites that do not require the use of 18-crown-6 or other organic templating agents, and that require shorter reaction times than those previously described.

Several preferred aspects of the RHO zeolites and manufacturing methods according to the present invention are outlined below.

Aspect 1: An as-crystallized NaCsRHO zeolite having an Si/Al ratio of from 3.1 to 3.6, wherein the zeolite has an $O_2$ capacity of less than 0.015 mmol/g as measured by single point isotherm for 02.

Aspect 2: The zeolite of Aspect 1, wherein the zeolite has an $O_2$ capacity of less than 0.010 mmol/g as measured by single point isotherm for $O_2$.

Aspect 3: The zeolite of Aspect 1, wherein the zeolite has an $O_2$ capacity of less than 0.005 mmol/g as measured by single point isotherm for $O_2$.

Aspect 4: The zeolite of any one of Aspects 1 to 3, wherein the zeolite has an Ar capacity of less than 0.015 mmol/g as measured by single point isotherm for Ar.

Aspect 5: The zeolite of any one of Aspects 1 to 3, wherein the zeolite has an Ar capacity of less than 0.010 mmol/g as measured by single point isotherm for Ar.

Aspect 6: The zeolite of any one of Aspects 1 to 3, wherein the zeolite has an Ar capacity of less than 0.005 mmol/g as measured by single point isotherm for Ar.

Aspect 7: A RHO zeolite formed from the as-crystallized NaCsRHO zeolite of Aspect 1 by exchanging some or all of the Na and Cs cations present in the as-crystallized NaCsRHO zeolite with one or more other types of extra-framework cations.

Aspect 8: The RHO zeolite of Aspect 7, wherein the zeolite contains non-proton extra-framework cations, wherein the size, number, and charge of the extra-framework cations that are present in the zeolite are such that 1.8 or fewer non-proton extra-framework cations per unit cell are required to occupy 8-ring sites, and wherein the zeolite has a unit cell axis length of from 14.23 Å to 14.55 Å.

Aspect 9: The RHO zeolite of Aspect 7 or 8, wherein the zeolite contains at most 6 protons per unit cell.

Aspect 10: The RHO zeolite of any one of Aspects 7 to 9, wherein the RHO zeolite contains $Li^+$, $Mg^{2+}$, $Mn^{2+}$, $Fe^{2+}$, $Co^{2+}$, $Ni^{2+}$, $Cu^{2+}$ and/or $Zn^{2+}$ cations.

Aspect 11: The RHO zeolite of any one of Aspects 7 to 10, wherein the RHO zeolite contains $Li^+$ and/or $Zn^{2+}$ cations.

Aspect 12: The RHO zeolite of Aspect 11, wherein said Li$^+$ and/or Zn$^{2+}$ cations make up the majority of the non-proton extra-framework cations that are present per unit cell.

Aspect 13: The RHO zeolite of Aspect 11, wherein said Li$^+$ and/or Zn$^{2+}$ cations make up at least 70% of the non-proton extra-framework cations that are present per unit cell.

Aspect 14: A method of making a RHO zeolite, the method comprising the steps of:
forming a gel comprising SiO$_2$, Al$_2$O$_3$, Na$_2$O, Cs$_2$O, and H$_2$O, wherein the SiO$_2$:Al$_2$O$_3$ molar ratio is from 10.4 to 11.2, the (Na$_2$O+Cs$_2$O):SiO$_2$ molar ratio is from 0.3 to 0.4, and the H$_2$O:SiO$_2$ molar ratio is from 6.0 to 10.5;
aging the gel by maintaining the gel at a temperature of from 20 to 30° C. for a period of from 1 to 5 days; and
crystallizing and separating the aged gel into a crystallized NaCsRHO zeolite precipitate and a mother liquor by heating the aged gel to a temperature of from 85 to 105° C. and maintaining the gel at a temperature of from 85 to 105° C. for a period of from 3 to 5 days.

Aspect 15: The method of Aspect 14, wherein the gel does not contain 18-crown-6.

Aspect 16: The method of Aspect 14, wherein the gel does not contain any organic templating agents.

Aspect 17: The method of Aspect 14, wherein the gel does not contain any organic compounds.

Aspect 18: The method of any one of Aspects 14 to 17, wherein the SiO$_2$:Al$_2$O$_3$ molar ratio of the gel is from 10.6 to 11.0.

Aspect 19: The method of any one of Aspects 14 to 18, wherein the H$_2$O:SiO$_2$ molar ratio of the gel is from 7.0 to 9.0.

Aspect 20: The method of any one of Aspects 14 to 19, wherein the gel is formed by mixing at a temperature of from 20 to 30° C. water and sources of silica, alumina, sodium, and cesium.

Aspect 21: The method of any one of Aspects 14 to 20, wherein the gel is aged for a period of from 1 to 2 days.

Aspect 22: The method of any one of Aspects 14 to 21, wherein the aged gel is crystallized and separated by heating the aged gel to a temperature of from 90 to 100° C. and maintaining the gel at a temperature of from 90 to 100° C. for a period of from 3 to 5 days.

Aspect 23: The method of any one of Aspects 14 to 22, wherein the method further comprises the steps of:
filtering the crystallized NaCsRHO zeolite from the mother liquor;
washing the crystallized NaCsRHO zeolite with water; and, optionally
drying the crystallized NaCsRHO zeolite.

Aspect 24: The method of Aspect 23, wherein the crystallized NaCsRHO zeolite is filtered via vacuum or pressure filtration.

Aspect 25: The method of Aspects 23 or 24, wherein the crystallized NaCsRHO zeolite is washed until a ratio of 5 g of suspended RHO product per 100 mL of water has a pH of from 9 to 11.

Aspect 26: The method of any one of Aspects 23 to 25, wherein the method further comprises exchanging some or all of the Na$^+$ and Cs$^+$ cations in the filtered, washed, and optionally dried NaCsRHO zeolite with other cations.

Aspect 27: The method of Aspect 26, wherein the Na$^+$ and Cs$^+$ cations in the filtered, washed, and optionally dried NaCsRHO zeolite are exchanged with NH$_4^+$ cations to provide an (NH$_4$)RHO zeolite; optionally some or all of the NH$_4^+$ cations in the (NH$_4$)RHO zeolite are then exchanged with Na$^+$ and/or Ca$^{2+}$ cations; and then some or all of the NH$_4^+$, Na$^+$ and/or Ca$^{2+}$ cations in the zeolite are exchanged with Zn$^{2+}$ and/or Li$^+$ cations to provide a zinc-exchanged and/or lithium-exchanged RHO zeolite.

BRIEF DESCRIPTION OF SEVERAL VIEWS OF THE DRAWINGS

FIG. 1 shows a set of SEM (Scanning Electron Microscopy) images (labelled A to D) of various as-crystallized RHO zeolites produced under various different synthesis conditions.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from the scope of the claimed invention.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, the phrase "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

As will be understood by those skilled in the art, zeolite structures are often defined in terms of extended structural frameworks of oxygen-linked tetrahedra (L. Pauling, "The Nature of the Chemical Bond", 3$^{rd}$ Edition, Cornell University Press, Ithaca, 1960.; D. W. Breck, "Zeolite Molecular Sieves", Robert E. Krieger Publishing Co., 1984). In the extended tetrahedral framework, the so-called "framework cations" of the structural framework (i.e. silicon, Si$^{4+}$, and aluminum, Al$^{3+}$, cations) are surrounded by oxygen anions, O$^{2-}$, at the four corners of a tetrahedron. When the charge of the framework cation is "4+", as is the case when the framework cation is the silicon cation, charge neutrality of the extended tetrahedral framework is maintained by sharing each of the oxygen anions between, on average, two tetrahedra, each tetrahedron being a charge neutral "SiO$_4$". Conversely, where the charge of the framework cation is "3+", as is the case when the framework cation is the aluminum cation, similar sharing of oxygen anions between, on average, two tetrahedra leads to each aluminum-centered tetrahedron being negatively charged, i.e., "AlO$_4$". The resulting negative charge in the [(Al$_x$Si$_{1-x}$)O$_2$]$^{x-}$ polyanionic framework is balanced by so-called "extra-framework cations" that are located at interstitial or non-framework sites in the extended structure. These charge-balancing extra-framework cations (which are often also called "non-framework cations") can often be exchanged with other cations by standard cation exchange methods. Exemplary extra-framework cations include alkali and alkaline earth metal cations, transition metal cations, and protons (i.e. hydrogen cations).

As will also be understood by those skilled in the art, although the extra-framework cations and framework cations present in a zeolite are referred to (as is conventional in the field) as cations, their interactions with the framework oxygen anions of the zeolite are not in practice fully ionic. The bonding of the framework silicon and aluminum cations to the oxygen anions is sufficiently covalent that these framework cations are not readily exchangeable with other cations by standard cation exchange methods. As regards the extra-framework cations, it is likely that smaller, higher charge density cations such as $Li^+$ or $Ca^{2+}$, create larger distortions in the zeolite framework than larger, lower charge density cations such as $K^+$ and $Cs^+$. This is due in part to the greater covalent interaction with framework oxygen ions. Also, as regards the extra-framework cations, the hydrogen cation or proton may perform its role in balancing negative framework charge by forming a relatively covalent bond with the framework oxygen anion (and indeed it has been hypothesized that in practice said protons associate with said oxygen anions in the form of structural hydroxyl groups; D. W. Breck, Zeolite Molecular Sieves, Robert E. Krieger Publishing Co., 1984).

As noted supra, RHO zeolites in their initially synthesized, as-crystallized form contain sodium and cesium cations as the sole extra-framework cations, and when fully hydrated they have in this form a centrosymmetric body centered cubic (bcc) structure. However, dehydration and/or cation exchange (i.e. substitution of the initially present sodium and cesium cations with other extra-framework cations) can result in distortion of the cubic unit cell structure. As used herein, and unless otherwise indicated, the term "RHO zeolite" without any further qualifier encompasses both RHO zeolites in their initially synthesized and hydrated form and RHO zeolites that have been dehydrated and/or subject to cation exchange. It is to be understood by those skilled in the art that RHO need not be cubic and can be distorted to a lower symmetry subgroup via cation exchange and/or dehydration.

As used herein, the term "as-crystallized RHO zeolite" refers to a RHO zeolite in its initially crystallized form, in which the sole extra-framework cations that are present are sodium and cesium cations (which cations are required for process of synthesizing and crystallizing the RHO zeolite), and in which in particular the relative fractions of the zeolite that are in the form polyhedral crystallites or in the form of polycrystalline aggregates, is dictated by the process by which the RHO zeolite was synthesized and crystallized. The "as-crystallized" RHO zeolite may have been isolated from its preparation medium (i.e. the mother liquor from which the RHO zeolite was crystallized), such as for example by one or more filtration and/or drying steps, and so may be in dehydrated form, but otherwise has not been subjected to any subsequent modifications (such as, for example, any cation exchange steps).

Conversely, as used herein the term "cation-exchanged RHO zeolite" or "ion-exchanged RHO zeolite" refers to a RHO zeolite that has been subjected to one or more ion exchange steps so as to replace some or all of the extra-framework cations initially present in the as-crystallized RHO zeolite (i.e. the initially present sodium and cesium cations) with other extra-framework cations.

As used herein, the term "NaCsRHO" zeolite refers to a RHO zeolite in which the only extra-framework cations are sodium and cesium cations (such as, for example, is the case for an as-crystallized RHO zeolite). Similarly, and unless otherwise indicated, a "NaRHO" zeolite is a RHO zeolite in which the only extra-framework cations are sodium cations, an "$(NH_4)RHO$" zeolite is a RHO zeolite in which the only extra-framework cations are ammonium cations, a "HRHO" zeolite is a RHO zeolite in which the only extra-framework cations are protons, a "LiRHO" zeolite is a RHO zeolite in which the only extra-framework cations are lithium cations, a "ZnRHO" zeolite is a RHO zeolite in which the only extra-framework cations are zinc cations, and so on.

Unless otherwise indicated, all references herein to the silicon to aluminum (Si/Al) ratio of a zeolite indicate the Si/Al ratio rounded to one decimal place. The Si/Al ratio of a zeolite can, for example, be determined using solid state $^{29}Si$ NMR. Further details of suitable solid state $^{29}Si$ NMR techniques and methods of determining the Si/Al ratio of a zeolite from the resulting NMR data are provided in the Experimental section, infra.

As used herein, all references to a zeolite using the designation RHO(X.X), where "X.X" is number, indicate a RHO zeolite having a silicon to aluminum ratio that is X.X (rounded to one decimal place). Thus, by way of example, the known prior art mixed-cation RHO zeolite $Li_{7.1}Na_{1.93}Cs_{0.3}Al_{11.7}Si_{36.3}O_{96}$, which has a silicon to aluminum (Si/Al) ratio of 36.3/11.7=3.1025641, can also be referred to as $Li_{7.1}Na_{1.93}Cs_{0.3}RHO(3.1)$.

U.S. patent application Ser. Nos. 15/718,467, and 15/718,620, discussed supra, describe various cation-exchanged RHO zeolite compositions and their application to PSA processes and specifically PSA processes for the removal of oxygen from oxygen-containing fluid streams. A number of these RHO zeolite compositions provide high kinetic selectivity for $O_2$ versus Ar and $O_2$ versus $N_2$ adsorption at ambient temperatures. Thus, the cation-exchanged RHO zeolite materials discussed in these applications appear to have ideal properties for removal of $O_2$ from other gases such as, for example, argon-containing streams.

Without intending to be bound by theory, it is believed that the cation-exchanged RHO zeolites described in these applications achieve their desirable adsorption properties based on the nature of the 8-ring openings of these structures, through which gas molecules must pass to enter the RHO cages. In RHO, these rings are very flexible and can undergo significant distortion from circular to highly elliptical depending on extra-framework cation site and type. Optimization of the extra-framework cation sites, as well as the generation of elliptical 8-ring openings, are likely important factors in allowing the very rapid uptake of elongated oxygen molecules versus the slow uptake of spherical argon atoms.

Extra-framework cations in RHO zeolites can occupy at least one of three different sites in the unit cell cage. It is known that small cations, comparable in size to $Li^+$, i.e. those with a 6-coordinate cation radius as defined by Shannon (R. D. Shannon, Acta Cryst. 1976, A32, 751-767.) of 0.8 Å and below, can reside in 6-ring openings within the unit cell cage. There are 8 of these sites per RHO unit cell in any RHO composition with Si/Al of 5 or less. Smaller cations, 0.8 Å and below, can also occupy one of 12 sites at the center of individual 8-ring openings, and will be required to occupy those sites if all eight of the 6-ring sites are already filled. In addition to $Li^+$, examples of cations with 6-coordinate Shannon cationic radii smaller than 0.8 Å are $Mg^{2+}$ and divalent cations of the first-row transition series and more specifically $Mn^{2+}$, $Fe^{2+}$, $Co^{2+}$, $Ni^{2+}$, $Cu^{2+}$, and $Zn^{2+}$.

Intermediate size cations, i.e. those with a 6-coordinate Shannon cation radius from 0.8 to approximately 1.3 Å, can reside in one of 12 sites at the center of individual 8-ring openings and, in some cases, at one of 6 sites at the center of two 8-ring windows in the RHO unit cell. They are unable to fit in the 6-ring sites under ambient conditions, i.e. between 0 and 50° C., unless the unit cell is already expanded by >50% filling of possible 8-ring sites. As an example, in U.S. Pat. No. 5,944,876, Corbin teaches of fully and partially Cd exchanged RHO zeolites, with Si/Al>3, including RHO compositions with at least 1 $Cd^{2+}$ cation per unit cell, with an assortment of other cations. Because of the size of the $Cd^{2+}$ cations these compositions require at least one cation, namely the $Cd^{2+}$ cation to reside in an 8-ring position at ambient conditions The largest cations with a 6-coordinate Shannon cation radius larger than 1.3 Å, including $Cs^+$ (which as noted above is required in the RHO crystallization process), usually occupy one of 6 sites at the center of two 8-ring windows in the RHO unit cell.

Small, monovalent cations, such as $Li^+$ are very electropositive and have been shown to cause large elliptical distortions in the 8-ring openings. Larger, divalent cations, such as $Ca^{2+}$ and $Cd^{2+}$ are also very electropositive and have been shown to cause even larger distortions of the 8-ring openings. In contrast, very small protons, or $H^+$ cations, cause no distortion of the RHO 8-rings, presumably because they directly bind to one of the zeolite oxygen atoms.

It has been suggested that while the larger $Ca^{2+}$ cations distort and block 8-ring openings, thereby inhibiting gas uptake, the smaller $Li^+$ cations, while still distorting the 8-rings, could leave enough of the 8-rings open to still permit some gas uptake. This concept was demonstrated, in part, by Corbin in U.S. Pat. No. 7,169,212, who showed that $Li_{7.1}Na_{1.93}Cs_{0.3}RHO(3.1)$ could adsorb $O_2$ with effective exclusion of $N_2$. Unfortunately, the $O_2$ uptake rate of this material is extremely slow and is too slow for PSA applications. While no detailed structural data with cation positions is presented for this material it has been shown that by Paul A. Wright and co-workers (J. Am. Chem. Soc. 2012, 134, 17628) that lithium-rich compositions have relatively small unit cells with unit cell axis lengths <14.3 Å. Because the unit cell is small, one can infer that at least 2.2 of the larger, non-proton cations, namely the sodium and cesium cations, must occupy 8-ring blocking positions. The sodium and cesium cations are too large to fit in 6-rings when the unit cell is so small and fill a total of 2.2 of the 8-ring positions per unit cell. The full cation balance is not reported for this material, and it is possible that additional non-proton cations are forced to reside in the 8-ring. If the cation balance was completed with any monovalent cations other than protons, as many as 3.7 non-proton cations would be required to reside in 8-rings. Regardless, the $O_2$ uptake rate reported is very slow and is consistent with at least 2.2 non-proton cations being forced to reside in the 8-rings of this composition, based on other comparative examples. For a RHO material with Si/Al of 3.2, even when all of the cations are small enough to fit in 6-ring windows, if they are monovalent, such as $Li^+$, at least 3.4 of them would be required to reside in 8-ring windows, based on the charge balance required for a RHO(3.2) material. In a comparative example described in U.S. patent application Ser. Nos. 15/718,467, and 15/718,620, fully lithium-exchanged $Li_{11.4}RHO(3.2)$ was demonstrated to show good kinetic selectivity for oxygen over nitrogen and argon, but the oxygen uptake rate was still much slower than CMS and was indeed comparable to the material described by Corbin. Conversely, in another comparative example, it was shown that fully proton-exchanged $H_{10.7}RHO(3.5)$ and $H_{9.2}RHO$ (4.2) adsorb $O_2$, $N_2$, and Ar very rapidly, but non-selectively, consistent with an absence of distortion in the 8-ring windows.

In U.S. patent application Ser. No. 15/718,620, the cation-exchanged RHO zeolites that are used as adsorbents are RHO zeolites containing non-proton extra-framework cations, wherein the size, number and charge of the extra-framework cations that are present in the zeolite are such that 1.8 or fewer non-proton extra-framework cations per unit cell are required, by virtue of their size, charge, and/or the total number of extra-framework cations, to occupy 8-ring blocking sites, and wherein the zeolite has a unit cell axis length of from 14.23 Å to 14.55 Å.

For RHO compositions with Si/Al between 3.1 and 4.5, the extent of aluminum substitution, and consequently the formal negative charge which must be balanced, ranges from 11.7 to 8.7. To ensure that 1.8 or fewer non-proton extra-framework cations per unit cell are required to occupy 8-ring sites, a combination of one or more of three different strategies can be used, as described in U.S. patent application Ser. Nos. 15/718,467, and 15/718,620.

Firstly, small, divalent cations can be used in order to reduce the total number of extra framework cations that are required per unit cell to balance the negative charge of the framework. For example, as previously discussed, $Li_{11.4}RHO(3.2)$ is forced to have at least 3.4 $Li^+$ cations in 8-ring blocking positions, once all 6-ring positions are filled. Conversely, $Zn_{5.7}RHO(3.2)$ satisfies the charge balance of RHO(3.2) with potentially no cations in 8-ring windows, i.e., all cations are small enough to fit in 6-rings (the Shannon 6-coordinate cation radius for $Zn^{2+}$ is 0.74 Å) and there are enough 6-rings to hold all of the cations. In actuality, some of the $Zn^{2+}$ cations are observed to reside in 8-rings in the $Zn_{5.7}RHO(3.2)$ unit cell but, by virtue of their size and number, there is the potential for them to move between the 6-rings and 8-rings.

Secondly, the number of distorting cations required to be in 8-ring windows can also be decreased by increasing the Si/Al ratio. As the Si/Al ratio of RHO goes from 3.2 to 3.9 to 4.2, LiRHO compositions go from $Li_{11.4}RHO(3.2)$, to $Li_{9.8}RHO(3.9)$, to $Li_{9.2}RHO(4.2)$.

Thirdly, the number of distorting cations required to occupy blocking 8-ring positions can be reduced by substituting of blocking cations with protons, which presumably do not distort the 8-rings. Corbin in U.S. Pat. No. 7,169,212, also mentions the possibility that mixed cation RHO materials with partial exchange of $H^+$ (e.g. H,CsRHO) could be prepared which would "give at least some of the desired distortion and smaller pore size," but no specific compositions were reported. Paul A. Wright and co-workers (J. Am. Chem. Soc. 2012, 134, 17628) also described the preparation of mixed $Li_{9.8-x}H_xRHO(3.9)$, but no adsorption data was reported.

The commercial utilization of the cation-exchanged RHO zeolites such as those described above is dependent on several factors. Adsorption-based processes, and in particular PSA processes based on kinetic selectivity of gas adsorption, are highly dependent on zeolite adsorbent purity and particle uniformity. Both rates and capacities are affected by zeolite adsorbent purity and particle uniformity. At best, crystalline and non-crystalline impurity phases present in the bulk adsorbent materials limit the target capacity of selective adsorption by lowering the concentration of active adsorbent. At worst, these phases can contribute to blocking of the pores of the bulk adsorbent, further limiting capacity and dramatically affecting adsorbent kinetics. High purity RHO (3.9-4.5) zeolites with good particle size and morphological uniformity are readily prepared using gels that contain 18-crown-6 as the structure directing agent. Unfortunately, this route is challenged commercially by the high cost of the 18-crown-6 templating agent and the added unit operation and difficulty fully removing the templating agent by calcination at high temperature.

Organic, template-free routes to RHO zeolites are desirable from the standpoint of cost, but the cubic, cesium-containing pollucite zeolite phase appears to be a very common and somewhat difficult impurity to control in the absence of template, particularly in lower SAR (silica/alumina ratio) gel formulations. In Comparative Example 1 of the present application, described infra, it was shown that even following the most preferred gel composition, aging, and crystallization conditions described by Robson (U.S. Pat. No. 3,904,738) leads to a zeolite mixture of RHO and large amounts of pollucite, based on XRD analysis (c.f. Table 1, infra). SEM analysis of the product from this example is shown in Image A of FIG. 1 and shows rather poorly formed, roughly spherical crystals compared with more well-formed polyhedral crystals observed in higher purity RHO phases. Comparative Example 9 of the present application, described infra, likewise shows that higher crystallization temperatures, >105° C., also lead to higher levels of pollucite impurity in the RHO.

When following the method of Corbin and coworkers (Journal of the American Chemical Society, 1990, 112, 4821), as done in Comparative Example 2 of the present application, described infra, which method utilizes a gel with higher silica/alumina (SAR) ratio and higher water to silica ratio than the method of Robson, the present inventors were able to produce RHO zeolite as the main crystalline phase. However, significant quantities of pollucite, harmatone and natrolite were still observed (c.f. Table 1, infra). A comparison of the adsorption data (c.f. Table 2, infra) for the proton- and zinc-exchanged forms of this sample compared with those exchanged forms of higher crystallographic purity, confirms that these impurities lower the overall capacity of the RHO adsorbent. The impact on capacity is most clearly seen in the comparison of the fully open and undistorted HRHO zeolites prepared from the as-crystallized zeolite of Comparative Example 2 and the undistorted HRHO zeolites prepared from the as-crystallized zeolite of Example 4 (c.f. Table 2, infra). The 02 adsorption capacity, or Pmax, of the HRHO zeolite prepared from Comparative Example 2 is ~35% lower than the Pmax of the HRHO zeolite prepared from Example 4, which showed little or no impurity phases by XRD. SEM analysis of the product from Comparative Example 2 is shown in image B of FIG. 1 and shows what appears to be a standard mixture of morphologies containing polyhedral single crystallites and somewhat spherical polycrystalline aggregates.

The presence of RHO with these mixed morphologies from the existing, template-free NaCsRHO(3.2) crystallization routes has been described by Mousavi and coworkers (Mousavi, S. F. et. al, Ceramics International, 2013, 39, 7149). They evaluated the effects of crystallization time, synthesis temperature, water content, and alkalinity during synthesis on the resulting RHO(3.2) particle shape and size. Though not explicitly cited, the authors follow a synthesis recipe found in the original Corbin work (U.S. Pat. No. 7,169,212). It was shown during this study by SEM microscopy that RHO(3.2) naturally crystallizes concurrently in two different particle morphologies: 1) polyhedral crystallites of presumably uniform density and 2) polycrystalline aggregates of roughly the same overall size but composed of many, much smaller crystallites grown together. X-ray diffraction data presented in the study for the bulk mixed morphology material indicates uniform NaCsRHO(3.2), suggesting that both particle morphologies are RHO(3.2) with the same chemical composition, within the detection limit of XRD.

The potential impact of these two very different morphologies on the adsorption properties of RHO materials has not previously been understood.

Structural studies by Paul A. Wright and co-workers (J. Am. Chem. Soc. 2012, 134, 17628) show that all 8-ring window openings in as-crystallized NaCsRHO(3.9) are blocked by sodium or cesium cations, and in fact some sodium cations occupy 6-ring sites in the relatively large unit cell of this zeolite. Because NaCsRHO(3.2) requires 2.6 additional monovalent extra framework cations/unit cell, similar blocking of all of the 8-ring windows of NaCsRHO (3.2) is likewise to be expected.

As a consequence, it is to be expected that micropore adsorption of non-polar gases such as oxygen, nitrogen, or argon, should be negligible, or at least extremely slow in as-crystallized NaCsRHO zeolites in general, an in as-crystallized NaCsRHO zeolites having Si/Al ratios of 3.1 to 3.6, i.e. NaCsRHO (3.1-3.6) zeolites, in particular.

In Comparative Examples 2 and 3 and Example 4 of this application, described infra, the inventors measured oxygen adsorption data on the as-crystallized NaCsRHO(3.2). In Comparative Example 3, argon adsorption data was also collected. Among these samples tested, only as-crystallized NaCsRHO(3.2) of Example 4 approached the expected negligible micropore adsorption of the non-polar gases. The as-crystallized RHO zeolite of Comparative Example 2 showed rapid uptake of 0.017 mmol/g oxygen. The as-crystallized RHO zeolite of Comparative Example 3, prepared from a similar gel composition to that used in Comparative Example 2 but with much shorter aging and crystallization time, provided essentially crystallographically pure NaCsRHO(3.2) by XRD, but nevertheless showed an even higher (0.034 mmol/g) rapid oxygen uptake. The as-crystallized RHO zeolite of Comparative Example 3 also showed 0.034 mmol/g rapid Ar uptake, demonstrating that the rapid non-polar gas uptake observed is unselective. SEM images for the as-crystallized RHO zeolites of Comparative Examples 2 and 3 (images B and C in FIG. 1) and as-crystallized RHO zeolite of Example 4, show, at least qualitatively, that the relative concentration of RHO as polycrystalline aggregates is significantly higher for the as-crystallized RHO zeolites of Comparative Examples 2 and 3 than for the as-crystallized RHO zeolite of Example 4. The presence of RHO in the form of polycrystalline aggregates, as opposed to in the form of polyhedral crystallites (polyhedral single crystals), therefore correlates with the level of unselective adsorption of non-polar gases. These polycrystalline aggregates appear to be made up of 50-100 nm microcrystals. Without intending to be bound by theory, it is possible that these very small crystallites and the voids created in and around them in the agglomerates act as a source of unselective, high surface area when present.

For adsorption processes, particularly those which rely on kinetic or rate of adsorption differences among different sized gases in carefully-controlled micropore structures, the presence of unselective adsorption in a composition seriously hinders the ultimate selectivity and efficiency of an adsorbent. As a precursor for the cation-exchanged RHO zeolite adsorbents, such as for example those described in U.S. patent application Ser. Nos. 15/718,467 and 15/718,620, the as-crystallized NaCsRHO zeolite should therefore have negligible or very slow non-polar gas adsorption, so that the micropore size and shape and consequently selectivity of oxygen vs nitrogen and argon adsorption can be effectively tuned by the subsequent cation exchange process.

Disclosed herein are methods by which as-crystallized NaCsRHO zeolites can now be prepared, having Si/Al ratios of from 3.1 to 3.6, and a morphology wherein a high fraction of zeolite is in the form of polyhedral crystallites and a low fraction is in the form of polycrystalline aggregates, such that the as-crystallized NaCsRHO zeolite shows negligible or very slow non-polar gas adsorption.

Accordingly, disclosed herein in accordance with one aspect of the present invention is an as-crystallized NaCsRHO zeolite, having an Si/Al ratio of from 3.1 to 3.6, wherein the zeolite has an $O_2$ capacity of less than 0.015 mmol/g, more preferably <0.010 mmol/g, and most preferably <0.005 mmol/g as measured by single point isotherm for $O_2$. Negligible oxygen capacity in this zeolite ensures maximum tunability of the adsorption properties of the zeolite when ion-exchanged so as to be used as an adsorbent.

The $O_2$ capacity (i.e. $O_2$ adsorption capacity) as measured by single point isotherm for $O_2$ of an as-crystallized NaCsRHO zeolite in accordance with the present invention is measured and determined as follows. A fixed weight of glass beads is placed in an evacuated chamber of fixed volume that is maintained at 30° C. A predetermined quantity of pure oxygen is introduced into the chamber, and the pressure in the chamber is then allowed to equilibrate, with the quantity of oxygen that is introduced being selected such that that the equilibrium pressure that is reached is 608 Torr (0.8 atm, 0.81 kPa), this equilibrium pressure being used as a reference equilibrium pressure. The chamber is then evacuated and the glass beads removed. The as-crystallized zeolite, in its dry, activated state, is then placed in the evacuated chamber, which is again maintained at 30° C., the weight of as-crystallized zeolite that is placed in the chamber being the same as the weight of glass beads that was previously used. The same predetermined quantity of oxygen as used before is then again introduced into the chamber, and the pressure inside the chamber is once again allowed to equilibrate, with the new equilibrium pressure being recorded. The $O_2$ capacity of the as-crystallized zeolite can then be calculated by subtracting this new equilibrium pressure from the reference equilibrium pressure in order to calculate the pressure of oxygen that was adsorbed by the zeolite (as compared to the situation where the chamber just contained the same weight of glass beads), and this pressure value is then converted, based on the total system volume, into the amount of oxygen (in mmol) that was adsorbed per weight (in grams) of zeolite. As the as-crystallized zeolite according to the present invention should adsorb very little oxygen (as discussed supra), the equilibrium pressure reached in the chamber when containing the as-crystallized zeolite should be very close to, albeit slightly lower than, the reference equilibrium pressure, and thus this technique gives a value for $O_2$ capacity of the as-crystallized zeolite that approximates to the $O_2$ capacity of the as-crystallized zeolite as measured by single point isotherm for $O_2$ at 30° C. and 0.8 atm. This technique is further described in the Examples, infra.

Preferably the as-crystallized NaCsRHO zeolite also has an Ar capacity of less than 0.015 mmol/g, more preferably <0.010 mmol/g, and most preferably <0.005 mmol/g as measured by single point isotherm for Ar. The Ar capacity (Ar adsorption capacity) of the zeolite can be measured in the same way as the $O_2$ capacity is measured, as described above, but with pure argon being introduced into the chambers instead of pure oxygen.

Unless otherwise indicated, all references to adsorption capacities of zeolites, in units of mmol/g, refer to the adsorption capacities of the zeolite in units of mmol/g rounded to the number of decimal places indicated. Thus, for example, reference to a $O_2$ adsorption capacity of 0.010 mmol/g indicates an adsorption capacity of 0.010 mmol/g as rounded to three decimal places.

Preferably the as-crystallized NaCsRHO zeolite is >95% pure RHO zeolite, more preferably >97% pure RHO zeolite, and most preferably >98% pure RHO zeolite. High purity ensures the highest possible capacity in the final RHO adsorbent. The purity of the RHO zeolite is preferably measured by powder x-ray diffraction (XRD), as further described in the Examples, infra.

Preferably the as-crystallized NaCsRHO zeolite has a Na/Cs ratio of from 1.5 to 3.5. Unless otherwise indicated, all references herein to the sodium to cesium (Na/Cs) ratio of a zeolite indicate the Na/Cs ratio rounded to one decimal place.

In certain preferred embodiments, the as-crystallized NaCsRHO zeolite has a Si/Al ratio of from 3.1 to 3.3.

Exemplary as-crystallized NaCsRHO zeolites are further described in Examples 4-6, infra.

Disclosed herein in accordance with another aspect of the invention are ion-exchanged RHO zeolites formed from the as-crystallized NaCsRHO zeolites of the preceding aspect by exchanging some or all of the Na and Cs cations present in the as-crystallized NaCsRHO zeolite with one or more other types of extra-framework cations.

The ion-exchanged RHO zeolites in accordance with this aspect may, in particular, be formed by modifying the as-crystallized NaCsRHO zeolite of the preceding aspect via one or more ion exchange steps so as to obtain an ion-exchanged RHO zeolite having an extra-framework cation composition as described and disclosed in U.S. patent application Ser. Nos. 15/718,467 and 15/718,620 (the disclosures of which are incorporated herein in their entirety). When the as-crystallized NaCsRHO(3.1-3.6) zeolites described herein are used as a precursor for making ion-exchanged RHO(3.1-3.6) zeolites having extra-framework cation compositions as described in said previous patent applications, ion-exchanged RHO(3.1-3.6) zeolites having improved adsorption properties are obtained.

In particular, in a preferred embodiment according to this aspect the ion-exchanged RHO zeolite contains non-proton extra-framework cations, wherein the size, number, and charge of the extra-framework cations that are present in the zeolite are such that 1.8 or fewer non-proton extra-framework cations per unit cell are required to occupy 8-ring sites, and wherein the zeolite has a unit cell axis length of from 14.23 Å to 14.55 Å.

Preferably the ion-exchanged RHO zeolite has 1.6 or fewer and most preferably 1.0 or fewer non-proton extra-framework cations per unit cell, which, by virtue of their size, charge and/or number, are required to reside in 8-ring sites; and preferably the ion-exchanged zeolite has unit cell axis length of from 14.23 to 14.50 Å, and most preferably of from 14.30 to 14.45 Å

Preferably, the ion-exchanged RHO zeolite contains at most 6 protons per unit cell. More preferably, the zeolite contains at most 5 protons, at most 4 protons, at most 3 protons, at most 2 protons or at most 1 proton per unit cell.

Preferably, the ion-exchanged RHO zeolite contains $Li^+$, $Mg^{2+}$, $Mn^{2+}$, $Fe^{2+}$, $Co^{2+}$, $Ni^{2+}$, $Cu^{2+}$ and/or $Zn^{2+}$ cations. More preferably, the ion-exchanged RHO zeolite contains $Li^+$ and/or $Zn^{2+}$ cations. Preferably, said $Li^+$ and/or $Zn^{2+}$ cations make up the majority of the non-proton extra-framework cations that are present per unit cell. More preferably, said $Li^+$ and/or $Zn^{2+}$ cations make up at least 60%, at least 70%, at least 80% or at least 90% of the non-proton extra-framework cations that are present per unit cell.

As used herein, the term "non-proton extra-framework cation" refers to any extra-framework cation that is not a proton (hydrogen cation). Unless otherwise indicated, all references to numbers of non-proton extra-framework cations that are present per unit cell indicate total numbers of non-proton extra-framework cations (of any and all types) rounded to one decimal place. Thus, a requirement that there are "1.8 or fewer non-proton extra-framework cations per unit cell that are required to occupy 8-ring sites" indicates that the maximum number, rounded to one decimal place, of non-proton extra-framework cations per unit cell that may be required to occupy 8-ring sites is 1.8 non-proton extra-framework cations in total.

As used herein, the phrase "the zeolite contains at most 6 protons per unit cell" indicates that the zeolite contains at most 6.0 protons per unit cell (rounded to one decimal place), and so encompasses also zeolites containing no protons, but excludes a zeolite containing 6.1 protons or more per unit cell.

The extra-framework cation content of a zeolite, namely the numbers, and types, of extra-framework cations (including any protons) that are present per unit cell, can be determined by standard experimental techniques. For example, the extra-framework cation content of a zeolite can be determined by elemental analysis of the solid by energy dispersive spectroscopy (EDX) or by dissolution of a sample and analysis of the solution using inductively coupled plasma optical emission spectroscopy (ICP-OES). Where analysis of a zeolite by EDX or ICP-OES indicates that the negative charge per unit cell of the zeolite is not fully balanced by the non-proton extra-framework cations identified as being present, it is assumed that the remaining negative charge per unit cell is balanced by protons.

As used herein, the term "majority" means more than 50%. Thus, reference herein to one or more cations making up the majority of the extra-framework cations that are present per unit cell of a RHO zeolite indicates that said cation or cations, in their totality, constitute more than 50% of all the extra-framework cations (including any protons) that are present per unit cell of the RHO zeolite.

As used herein, all references to percentages of cations that are or must be present per unit cell indicate atomic percent (at. %) unless otherwise indicated. Thus, reference herein to one or more cations making up at least "X" at. % of the extra-framework cations that present per unit cell of a RHO zeolite indicates that said cation or cations, in their totality, constitute equal to or greater than X at. % of all the extra-framework cations (including any protons) that are present per unit cell of the RHO zeolite. For example, in the zeolite $Zn_{3.9}H_{2.1}Na_{1.3}RHO(3.2)$ there are 7.3 extra-framework cations per unit cell, of which 3.9 in total are $Zn^{2+}$ cations, thus in this composition $Zn^{2+}$ cations make up 53.4 at. % of the extra-framework cations that are present per unit cell, and so this composition would meet a requirement that the majority (i.e. more than 50%) of the extra-framework cations that are present are $Zn^{2+}$ cations.

Unless otherwise indicated, all references to the unit cell axis length of a RHO zeolite indicate the unit cell axis length of the cubic or approximately cubic RHO zeolite when dehydrated and as measured and determined using X-ray diffraction (XRD). Further details of suitable XRD techniques and methods of determining the unit cell length axis of a RHO zeolite from the resulting XRD data are provided in the Experimental section, infra. For example, the unit cell axis length of a dehydrated sample of RHO zeolite can be determined by Rietveld refinement of the XRD data. Unless otherwise indicated, all references herein to unit cell axis lengths of a RHO zeolite indicate the unit cell axis length rounded to two decimal places.

The as-crystallized NaCsRHO zeolites of the preceding aspect may be converted into the ion-exchanged RHO zeolites of the present aspect via any suitable ion exchange methods, such as those described in the cited applications by the ion-exchange methods described in U.S. patent application Ser. Nos. 15/718,467 and 15/718,620 (the disclosures of which are incorporated herein in their entirety) and/or those further described below.

When preparing adsorbent materials comprising the ion-exchanged RHO zeolites, as will be known to the person of ordinary skill in the art, the adsorbent material may be formed via standard techniques in order to prepare beaded, extruded, or laminated adsorbents, and in preparing such adsorbents any number of binder materials may be used in addition to the ion-exchanged RHO zeolite, such as aluminas, clays, attapulgite, etc.

According to another aspect of the invention disclosed herein, there is provided a method of making a RHO zeolite, the method comprising the steps of: forming a gel comprising $SiO_2$, $Al_2O_3$, $Na_2O$, $Cs_2O$, $H_2O$ and Si, wherein the $SiO_2$:$Al_2O_3$ molar ratio is from 10.4 to 11.2, the ($Na_2O$+$Cs_2O$):$SiO_2$ molar ratio is from 0.3 to 0.4, and the $H_2O$:$SiO_2$ molar ratio is from 6.0 to 10.5; aging the gel by maintaining the gel at a temperature of from 20 to 30° C. for a period of from 1 to 5 days; and crystallizing and separating the aged gel into a crystallized NaCsRHO zeolite precipitate and a mother liquor by heating the aged gel to a temperature of from 85 to 105° C. and maintaining the gel at a temperature of from 85 to 105° C. for a period of from 3 to 5 days.

Such methods are suitable for forming the as-crystallized NaCsRHO zeolites of the preceding aspect.

The method of manufacture according to this aspect use somewhat higher SAR (silica to alumina ratios) in the gel than those used in Robson, and a significantly lower water content, and hence $H_2O$:$SiO_2$ ratio, than described by Corbin. At the same time, the 1 to 5 day duration (and more preferably 1 to 2 day duration) of the gel aging step and the 3 to 5 day duration (and more preferably 3 to 4 day duration) of the of the crystallization step are generally shorter than the duration of the aging and crystallization steps of both of said prior art methods, which respectively use 4 and 6 day aging times and 7 and 6 day crystallization times. After isolation of the as-crystallized NaCsRHO product by standard methods, including for example such steps as example, gravity, vacuum, or pressure filtration, centrifugation, washing and/or drying, this method leads to a highly pure as-crystallized NaCsRHO zeolite composition, with a high polyhedral crystallite fraction, low fraction of polycrystalline aggregates, and exhibiting low levels of $O_2$ adsorption capacity (as measured by single point isotherm for $O_2$).

A distinct advantage of the methods of manufacture according to this aspect is that they do not require the use of 18-crown-6 or any other form of organic templating agent (i.e. any organic compound that is used in the gel to help dictate the structure of the zeolite as it is formed). Thus, according to a preferred embodiment the gel that is formed does not contain 18-crown-6. Preferably it does not contain any organic templating agents, or any organic compounds of any type.

Preferably the SAR, i.e. the $SiO_2:Al_2O_3$ molar ratio, of the gel is from 10.4 to 11.0, from 10.6 to 11.0 or from 10.6 to 10.8. Preferably the $H_2O:SiO_2$ molar ratio of the gel is from 6.0 to 10.0, or from 6.0 to 9.0, or from 7.0 to 9.0. Lower SAR ratios, in particular those below 10.4, appear to contribute to higher levels of other crystalline phase impurities, while higher water levels, in particular those resulting in $H_2O:SiO_2$ molar ratios above 10.5 contribute to higher levels of the polycrystalline aggregate morphology in the product RHO.

Unless otherwise indicated, all references herein to a number of days for which a step is carried out (such as the number of days for which a gel is aged, or the number of days for which an aged gel is heated to form a crystallized zeolite) refer to periods of time rounded to the nearest day. Thus, for example, a period of from 3 to 5 days encompasses, unless otherwise indicated, a period of 65 hours (3 days rounded to the nearest day) or a period of 130 hours, but does not encompass a period of 55 hours (which would be 2 days rounded to the nearest day). The step of aging the gel commences as soon as the components needed to form the gel (e.g. water and sources of silica, alumina, sodium, and cesium) are mixed together.

Unless otherwise indicated, all references herein to the $SiO_2:Al_2O_3$ molar ratio (or SAR) of a gel refer to the $SiO_2:Al_2O_3$ molar ratio rounded to one decimal place. Likewise, unless otherwise indicated, all references to the $(Na_2O+Cs_2O):SiO_2$ molar ratio of a gel refer to the $(Na_2O+Cs_2O):SiO_2$ molar ratio rounded to two decimal places, and all references to the $H_2O:SiO_2$ molar ratio of a gel refer to the $H_2O:SiO_2$ molar ratio rounded to one decimal place. The $SiO_2:Al_2O_3$ molar ratio, $(Na_2O+Cs_2O):SiO_2$ molar ratio and $H_2O:SiO_2$ molar ratio of the gel can be calculated from the masses of the components used to form the gel (e.g. water and sources of silica, alumina, sodium, and cesium).

Preferably, the gel is formed by mixing at a temperature of from 20 to 30° C. water and sources of silica, alumina, sodium, and cesium. The sources of silica, alumina, sodium and cesium may be of any suitable type, such as those well known in the art. For example, colloidal silica may be used as the source of silica, and aluminum isopropoxide and/or sodium aluminate may be used as sources of alumina, and sodium hydroxide and cesium hydroxide may be used as sources of sodium and cesium, respectively. Further suitable sources are described in U.S. Pat. Nos. 3,904,738 and 7,169,212, for example.

Preferably, the gel is aged by maintaining the gel at a temperature of from 20 to 30° C. for a period of from 1 to 2 days.

Preferably, the aged gel is crystallized and separated by heating the aged gel to a temperature of from 85 to 105° C. and maintaining the gel at a temperature of from 85 to 105° C. for a period of from 3 to 4 days; by heating the aged gel to a temperature of from 90 to 100° C. and maintaining the gel at a temperature of from 90 to 100° C. for a period of from 3 to 5 days; or by heating the aged gel to a temperature of from 90 to 100° C. and maintaining the gel at a temperature of from 90 to 100° C. for a period of from 3 to 4 days.

Optionally, the method may further comprise the steps of: filtering the crystallized NaCsRHO zeolite from the mother liquor; washing the crystallized NaCsRHO zeolite with liquid water; and, optionally, drying the crystallized NaCsRHO zeolite. Washing may be done by soaking the zeolite in liquid water, followed by filtration or by rinsing the zeolite with liquid water during the filtration step. The crystallized NaCsRHO zeolite may preferably be filtered via vacuum or pressure filtration. The crystallized NaCsRHO zeolite may preferably be washed until a ratio of 100 mL rinsate over 5 g of suspended RHO product has a pH of from 9 to 11.

Exemplary such methods are described in Examples 4-6, infra.

In certain embodiments the method may be a method for making an ion-exchanged RHO zeolite, wherein the method further comprises exchanging some or all of the $Na^+$ and $Cs^+$ cations in the filtered, washed, and optionally dried NaCsRHO zeolite with other cations. Such methods are suitable for forming the ion-exchanged RHO zeolites of the preceding aspect.

For example, the $Na^+$ and $Cs^+$ cations in the filtered, washed, and optionally dried NaCsRHO zeolite may be exchanged with $NH_4^+$ cations to provide an $(NH_4)$RHO zeolite; optionally some or all of the $NH_4^+$ cations in the $(NH_4)$RHO zeolite are then exchanged with $Na^+$ and/or $Ca^{2+}$ cations; and then some or all of the $NH_4^+$, $Na^+$ and/or $C^{2+}$ cations in the zeolite are exchanged with $Zn^{2+}$ and/or $Li^+$ cations to provide a zinc-exchanged and/or lithium-exchanged RHO zeolite.

Exemplary such methods are described in Example 10, infra.

EXAMPLES

The compositions described herein in the following examples were characterized in the following manner. In addition to measuring their adsorption properties, zeolite compositions were characterized by X-ray diffraction, $^{29}Si$ NMR, by elemental analysis using ICP-OES or EDX, and by scanning electron microscopy (SEM).

Powder x-ray diffraction (XRD) patterns of hydrated and dehydrated samples were measured on a Panalytical X'Pert Pro MPD over the range $5 \leq 2q \leq 85°$ using Co-K$\alpha$ radiation, a 0.033° step size, and a 400 sec/step count time. Each sample was ground and pressed onto a low-background mount, and in the case of air-sensitive samples were then covered with Kapton film. Crystalline phases in the XRD pattern were identified by comparing Bragg peak positions and relative intensities to those from reference patterns in the ICDD database. The cation exchange level was determined by elemental analysis using established methods, which involved either direct analysis on the solid zeolite by energy dispersive spectroscopy (EDX) or dissolution of the solid and subsequent analysis of the solution using inductively coupled plasma optical emission spectroscopy (ICP-OES).

Solid state $^{29}Si$ NMR spectra were obtained at ambient temperature on a Bruker Avance II 300 FT-NMR spectrometer, equipped with a 7 mm MAS probe. The acquisition was carried out using one pulse employing an 8-second recycle delay while the rotor was spun at 5000 Hz at magic angle. Peak deconvolution was performed using GRAMS/32 AI (version 6.00) software. Mixed Gaussian/Lorentzian line shapes were employed. From the relative peak areas, the Si/Al ratio was calculated using the equation:

$$\frac{Si}{Al} = \frac{\sum_{n=0}^{4} I_{Si_{(nAl)}}}{\sum_{n=0}^{4} 0.25\, n\, I_{Si_{(nAl)}}}$$

where Si/Al=Silicon to Aluminum ratio, I=Relative area of NMR peak;
$Si_{(nAl)}$=Silicon with n aluminum atoms as nearest neighbor bound through oxygen; and
n=Number of nearest aluminum atoms represented by the NMR peak.

A Perkin Elmer 3000DV Inductively Coupled Plasma Optical Emission Spectrometer was used for the ICP-OES sample analysis.

Scanning electron microscopy (SEM) analyses were performed using a Hitachi S-4800 field-emission SEM operated at 2 kV accelerating voltage.

EDX analysis on samples was performed in a JEOL JSM 5600 SEM, with an Oxford INCA Energy 200 EDX analyzer.

The $O_2$ adsorption capacity (also referred to herein as $O_2$ Pmax), as measured by single point isotherm for $O_2$, of each of the as-crystallized NaCsRHO zeolite samples was evaluated using a standard volumetric adsorption apparatus in the following manner. 2.2 g of glass beads were placed in an evacuated chamber, having a fixed volume of 86 mL, that is maintained at 30° C. A fixed quantity of pure oxygen was introduced into the chamber, bringing the pressure inside the chamber up to 760 Torr (1 atm, 101 kPa), after which the introduction of oxygen was stopped and the pressure in the chamber was allowed to equilibrate, following which the equilibrium pressure in the chamber was 608 Torr (0.8 atm, 0.81 kPa), this equilibrium pressure being used as a reference equilibrium pressure. The chamber was then evacuated and the glass beads removed. 2.2 g of the as-crystallized zeolite being tested, in its dry, activated state, was then placed in the evacuated chamber, which was again maintained at 30° C. The same fixed quantity of oxygen was again introduced into the chamber, bringing the pressure inside the chamber again up to 760 Torr (1 atm, 101 kPa), after which the introduction of oxygen was again stopped and the pressure inside the chamber was once again allowed to equilibrate, with the new equilibrium pressure then being recorded. The $O_2$ capacity of the as-crystallized zeolite was then calculated by subtracting the new equilibrium pressure from the reference equilibrium pressure in order to calculate the pressure of oxygen that was adsorbed by the as-crystallized zeolite, and this pressure value was then converted into the amount of oxygen (in mmol) adsorbed per weight (in grams) of as-crystallized zeolite. In each case the equilibrium pressure (whether for the zeolite sample being tested or for the reference case using glass beads) was recorded at the point in time where the rate of pressure drop inside the chamber had reached negligible levels or had stopped altogether (i.e. where the rate of pressure drop had fallen below 0.2 Torr/min (0.0003 atm/min, 0.03 kPa/min)), which in the case of all of the samples tested took less than 1 minute to occur. Ar adsorption capacity and $N_2$ adsorption capacity, as measured by single point isotherm for Ar or $N_2$ respectively, was measured in the same way but using a fixed quantity of pure argon or pure nitrogen, respectively, instead of pure oxygen. Likewise, the adsorption capacities for $O_2$, Ar or $N_2$ of ion-exchanged RHO zeolites prepared from the as-crystallized RHO zeolites was measured in the same way.

All of the RHO samples tested as described above were dried and activated under vacuum (<10 mPa) at 400° C. for at least 8 hours to remove water and $CO_2$ prior to adsorption measurements being carried out.

Comparative Example 1

NaCsRHO(3.2) was prepared using the "Most Preferred" gel composition given in Robson U.S. Pat. No. 3,904,738 B2. This sample is shown in image "A" in FIG. 1. The only change made to the Robson recipe was the use of sodium aluminate as the aluminum source rather than the "preferred" alumina trihydrate. Robson mentions in the same patent that sodium aluminate may be used. The composition of this gel was $SiO_2:Al_2O_3$ of 10.2, $(Na_2O+Cs_2O):SiO_2$ of 0.33, and $H_2O:SiO_2$ of 8.2. The source of silica was Ludox-40HS (with the water content from silica sol included in the gel ratio), and the sources of sodium and cesium were their respective hydroxide solutions (50 wt %). The gel composition was thoroughly mixed, allowed to age for 4 days at room temperature, and then heated for 4 days at 94° C. The resulting material was isolated by standard vacuum or pressure filtration methods and washed with water to until 5 g of the suspended RHO product in 100 mL water gave a pH of 10.5. Despite being the most preferred gel composition for RHO taught by Robson, we found by XRD analysis that the majority crystalline phase was Pollucite with <50% RHO material as shown in Table 1. Based on the relatively low purity of the RHO(3.2), no adsorption measurements were carried out.

Comparative Example 2

In another Comparative Example, a sample of NaCsRHO (3.2) was prepared using a modified version of the "Most Preferred" gel composition given in Robson. The sample shown in image "B" in FIG. 1, and XRD and adsorption data are recorded in Tables 1 and 2. In this example, the water content of the gel and the $SiO_2:Al_2O_3$ ratio was increased from the Robson patent to match that presented by Corbin and coworkers (*Journal of the American Chemical Society*, 1990, 112, 4821). The composition of this gel was $SiO_2$: $Al_2O_3$ of 10.8, $(Na_2O+Cs_2O):SiO_2$ of 0.31, and $H_2O:SiO_2$ of 11.0. The gel composition was thoroughly mixed, allowed to age for 6 days at room temperature, and then heated for 6 days at 94° C. as discussed in Corbin. The resulting material was isolated by standard vacuum or pressure filtration methods and washed with water until 5 g of the suspended RHO product in 100 mL water gave a pH of 10.5. Although this gave crystalline RHO with promising adsorption behavior, small impurity phases were always observed by XRD, the most common of which being Pollucite, Natrolite, and Harmotome. The resulting material had a somewhat irregular morphology by SEM imaging and particle size was on the order of 0.75 micron. This sample showed a rapid oxygen uptake Pmax on activated Na,CsRHO(3.2) of 8.5 Torr or 0.018 mmol/g at ~0.8 atm, calculated via adsorption rate uptake measurements as described above. Such adsorption in a RHO composition in which all 8-ring windows are fully blocked is not expected in the pure phase material and indicates the presence of some undesirable, unselective adsorption sites, which could be surface adsorption on or within the microcrystalline agglomerates. The HRHO form of the same material had oxygen uptake Pmax of 39 torr (0.078 mmol/g), and the resulting ZnRHO(3.2) had $O_2$, $N_2$, and Ar Pmax of 39 torr (0.078 mmol/g), 91 torr (0.18 mmol/g), and 30 torr (0.06 mmol/g), respectively.

TABLE 1

Synthesis Conditions and Analyses for Various RHO (3.2) Samples

| Example | Gel SiO$_2$:Al$_2$O$_3$ | Gel H$_2$O:SiO$_2$ | Observed Phases | SEM Particle Shape |
|---|---|---|---|---|
| Comparative 1 | 10.2 | 8.2 | Pollucite, Rho, Y, AlO(OH) | Mixed polyhedra, agglomerates, and impurities |
| Comparative 2 | 10.8 | 11.0 | Rho, Natrolite (minor), Harmotome (minor), Pollucite (minor) | Mixed polyhedra and agglomerates |
| Comparative 3 | 10.8 | 11.0 | Rho, Chabazite (minor) | Mixed polyhedra and agglomerates |
| 4 | 10.8 | 8.3 | Rho | Uniform |
| 5 | 10.8 | 6.5 | Rho | Uniform |
| 6 | 10.8 | 7.4 | Rho | Uniform |
| Comparative 7 | 10.0 | 11.2 | Rho, Analcime (minor) | Non-uniform |
| Comparative 8 | 10.8 | 11.0 | Did not crystallize | No indication of crystallization |
| Comparative 9 | 10.0 | 11.2 | Pollucite | Spherical |

Comparative Example 3

In another Comparative Example, a sample of NaCsRHO (3.2), was produced in which the gel composition of Comparative Example 2 was repeated but the gel aging time was shortened. The gel composition was thoroughly mixed, allowed to age for 2 hours at room temperature, and then heated for 8 days at 94° C. The resulting material was isolated by standard vacuum or pressure filtration methods and washed with water until 5 g of the suspended RHO product in 100 mL water gave a pH of 10.5. As shown in Tables 1 and 2, the purity of the RHO material by XRD improved over Comparative Example 1, but, as shown in image C of FIG. 1, the fraction of RHO in the form of polycrystalline agglomerates vs single crystal polyhedra increased. The average crystallite size also increased to about 3 micron. This Na,CsRHO showed relatively large, rapid uptakes of both oxygen and argon. The Pmax values measured for oxygen (and argon) were 16.5 torr (0.033 mmol/g) or nearly double the oxygen Pmax for comparative Example 2. This relatively large unselective capacity appears to correlate with the relative concentration of RHO present as polycrystalline aggregates in the sample. The resulting HRHO material had an O$_2$ uptake of 63.7 torr (0.13 mmol/g), an improvement over comparative Example 2, as well as ZnRHO O$_2$, N$_2$, and Ar Pmax values of 54 torr (0.11 mmol/g), 119 torr (0.24 mmol/g), and 38 torr (0.076 mmol/g). This example demonstrates that, while improvement in RHO compositional purity leads to increases in total adsorption capacity, the significant increase in concentration of RHO as polycrystalline agglomerates correlates with unselective NaCsRHO(3.2) O$_2$ uptake.

Example 4

A sample of NaCsRHO(3.2) was prepared by the method of this invention, in which the gel composition was adjusted to a lower water content such that the gel ratio was SiO$_2$:Al$_2$O$_3$ of 10.8, (Na$_2$O+Cs$_2$O):SiO$_2$ of 0.32, and H$_2$O:SiO$_2$ of 8.3. The source of silica was Ludox-40HS (with the water content from silica sol included in the gel ratio), the source of alumina was sodium aluminate, and the sources of sodium and cesium were their respective hydroxide solutions (50 wt %). Specifically, the gel contained 0.400 moles Na, 0.053 moles Cs, 0.133 moles Al, 0.718 moles Si, and 5.937 moles H$_2$O. Firstly, sodium aluminate and sodium hydroxide were dissolved in water and heated to create a clear solution. This caustic solution was then vacuum filtered and allowed to cool. Cesium hydroxide was then added and allowed to thoroughly mix before adding Ludox-40HS dropwise with rapid stirring such that minimal heating of the gel occurred (the reaction is exothermic in nature). The gel composition was thoroughly mixed, allowed to age for 2 days at room temperature, and then heated for 4 days at 94° C. The resulting material was isolated by standard vacuum or pressure filtration methods and washed with water until 5 g of the suspended RHO product in 100 mL water gave a pH of 10.5. As shown in Table 1 and 2, not only does this gel ratio give the purest RHO by XRD, but, as shown in image D of FIG. 1, it also provides a uniform polyhedral single crystal particle morphology with roughly 1 micron crystals and only a very small fraction of polycrystalline agglomerates. The activated NaCsRHO showed minimal unselective void space, with a rapid O$_2$ uptake of only 1.9 torr (0.004 mmol/g at ~0.8 atm). It is expected that the rapid micropore controlled adsorption of oxygen for uniform samples of microcrystalline NaCsRHO(3.2) should approach zero. The resulting HRHO material had the highest observed O$_2$ uptake with Pmax of 65.8 torr (0.13 mmol/g), and the highest ZnNaRHO(3.2) O$_2$, N$_2$, and Ar capacities with Pmax values of 59 torr (0.12 mmol/g), 144 torr (0.29 mmol/g), and 52 torr (0.10 mmol/g), respectively.

Example 5

A sample of NaCsRHO(3.2), was prepared by the method of Example 4, in which the gel composition was adjusted to a lower water content such that the gel ratio was SiO$_2$:Al$_2$O$_3$ of 10.8, (Na$_2$O+Cs$_2$O):SiO$_2$ of 0.32, and H$_2$O:SiO$_2$ of 6.5. The gel composition was thoroughly mixed, allowed to age for 2 days at room temperature, and then heated for 4 days at 94° C. The resulting material was isolated by standard vacuum or pressure filtration methods and washed with water until 5 g of the suspended RHO product in 100 mL water gave a pH of 10.5. As shown in Table 1, this gel ratio also produces crystallographically pure RHO by XRD and provides uniform particle single crystal polyhedral morphology of roughly 1 micron and a very small fraction of polycrystalline agglomerates.

Example 6

A sample of NaCsRHO(3.2) was prepared by the method of Example 4, in which the gel composition was adjusted to a lower water content such that the gel ratio was $SiO_2:Al_2O_3$ of 10.8, $(Na_2O+Cs_2O):SiO_2$ of 0.32, and $H_2O:SiO_2$ of 7.4. The gel composition was thoroughly mixed, allowed to age for 2 days at room temperature, and then heated for 4 days at 94° C. The resulting material was isolated by standard vacuum or pressure filtration methods and washed with water until 5 g of the suspended RHO product in 100 mL water gave a pH of 10.5. As shown in Table 1, this gel ratio also produces crystallographically pure RHO by XRD and provides uniform polyhedral morphology of roughly 1 micron and a very small fraction of polycrystalline agglomerates.

Comparative Example 7

A sample of NaCsRHO(3.2) was prepared using a "Preferred" gel composition given in Robson U.S. Pat. No. 3,904,738 B2. The only change made to the Robson recipe was the use of sodium aluminate as the aluminum source rather than the "preferred" alumina trihydrate. Robson mentions in the same patent that sodium aluminate may be used. The composition of this gel was $SiO_2:Al_2O_3$ of 10.0, $(Na_2O+Cs_2O):SiO_2$ of 0.34, and $H_2O:SiO_2$ of 11.2 (higher water loading than Comparative Example 1). The source of silica was Ludox-30HS (with the water content from silica sol included in the gel ratio), and the sources of sodium and cesium were their respective hydroxide solutions (50 wt %). The gel composition was thoroughly mixed, allowed to age for 4 days at room temperature, and then heated for 2 days at 94° C. The resulting material was isolated by standard vacuum or pressure filtration methods and washed with water until 5 g of the suspended RHO product in 100 mL water gave a pH of 10.5. Despite being a preferred gel composition for RHO taught by Robson, we found by XRD analysis that the sample contained small amounts of zeolite Analcime, which is undesirable, and the particle size was non-uniform by SEM analysis.

Comparative Example 8

A sample of NaCsRHO(3.2) was prepared with a gel composition the same as that of Comparative Example 2. The composition of this gel was $SiO_2:Al_2O_3$ of 10.8, $(Na_2O+Cs_2O):SiO_2$ of 0.31, and $H_2O:SiO_2$ of 11.0. The source of silica was Ludox-30HS (with the water content from silica sol included in the gel ratio), the sources of sodium and cesium were their respective hydroxide solutions (50 wt %), and the source of alumina was sodium aluminate. The gel composition was thoroughly mixed and then heated for 7 days at 80° C. No phase separation indicative of crystallization of RHO was observed in the gel, so no sample was recovered.

TABLE 2

Synthesis Conditions and Adsorption Properties for Various RHO (3.2) Samples

| | Comparative Example 2 | Comparative Example 3 | Example 4 | Example 5 | Example 6 |
|---|---|---|---|---|---|
| Gel $SiO_2:Al_2O_3$ | 10.8 | 10.8 | 10.8 | 10.8 | 10.8 |
| Gel $H_2O:SiO_2$ | 11 | 11 | 8.3 | 6.5 | 7.4 |
| Gel Alumina source | $NaAlO_2$ | $NaAlO_2$ | $NaAlO_2$ | | |
| Gel aging time | 6 days | 2 hours | 2 days | 2 days | 2 days |
| Gel crystallization time | 6 days | 8 days | 4 days | 4 days | 4 days |
| NaCsRHO $O_2$ $P_{max}$ (torr |(mmol/g)) | 8.5 (0.018) | 16.5 (0.034) | 1.9 (0.004) | 7.1 (0.014) | 1.6 (0.003) |
| HRHO $O_2$ $P_{max}$ (torr |(mmol/g)) | 39 (0.078) | 63.7 (0.13) | 65.8 (0.13) | | |
| ZnRHO/ZnNaHRHO $O_2$ $P_{max}$ (torr|(mmol/g)) | 39 (0.078) | 54 (0.11) | 59 (0.12) | | |
| ZnRHO/ZnNaHRHO $N_2$ $P_{max}$ (torr |(mmol/g)) | 91 (0.18) | 119 (0.24) | 144 (0.29) | | |
| ZnRHO/ZnNaHRHO Ar $P_{max}$ (torr |(mmol/g)) | 30 (0.060) | 38 (0.076) | 52 (0.10) | | |

Comparative Example 9

A sample of NaCsRHO(3.2) was prepared with a gel composition of $SiO_2:Al_2O_3$ of 10.0, $(Na_2O+Cs_2O):SiO_2$ of 0.34, and $H_2O:SiO_2$ of 11.2. The source of silica was Ludox-30HS (with the water content from silica sol included in the gel ratio), the sources of sodium and cesium were their respective hydroxide solutions (50 wt %), and the source of alumina was sodium aluminate. The gel composition was thoroughly mixed, allowed to age statically for 2 days, and then transferred to a Parr reactor and heated to 120° C. under autogenous pressure for 3 days. XRD of the sample showed phase-pure Pollucite with no evidence of zeolite RHO.

Example 10: Cation Exchange of RHO Zeolites

A variety of exchanged RHO(3.1 to 3.6) materials were prepared through ion-exchange of the starting $Na_{8.4}Cs_{3.0}RHO(3.2)$ from Comparative Examples 2 through 4, and Examples 5-7. Ammonium-exchanged RHO samples were prepared by repeated (8 times) exchange with a 40-fold excess (mole % basis) of 1M ammonium chloride solution at 90° C. for at least 4 hrs. Sodium-exchanged RHO materials were prepared from ammonium RHO zeolites through repeated (8 times) exchange with a 40-fold excess (mole % basis) of 1M sodium chloride solution at 90° C. for at least 4 hrs. Calcium-exchanged RHO materials were prepared from ammonium RHO zeolites through repeated (5 times) exchange with a 100-fold excess (mole % basis) of 1M calcium chloride solution at 90° C. for at least 4 hrs. The resulting NaRHO could be exchanged to Zn-enriched RHO (3.2) ($Zn_xRHO(3.2)$, where x>2.5) by repeated (4 to 5 times) exchange with 5.0 molar or 2.0 molar solutions of zinc nitrate hexahydrate in a ratio of 1 g zeolite: 20 mL of 5.0 m solution, or a ratio of 1 g zeolite:50 mL of 2.0 m solution at 90° C. for 4 hrs. It would appear that the ratio of $Zn^{2+}$ cations to $Na^+$ cations in the zeolite are the key factor in this exchange process. Final exchange compositions from NaRHO were determined by ICP-OES or EDX and are shown in Table 3. Analysis of the ICP-OES data assumed fully-occupied tetrahedral centers based on the Si:Al mole ratio and assuming full oxygen occupancy of the lattice. Where the analysis gives a cation charge balance which is lower than that needed for the number of aluminum atoms/unit cell in a given RHO composition, the difference is assumed to be made up with protons, e.g. $Zn_{3.1}Na_{2.6}RHO(3.2)$ is adjusted to $Zn_{3.1}Na_{2.6}H_{2.6}RHO(3.2)$ to fully balance the charge of the alumina centers/unit cell in RHO(3.2). Capacities in Table 3 are shown after activation to a final temperature of 450° C.

Example 11: Synthesis of $H_{10.7}RHO(3.5)$ $Na_{8.4}Cs_{3.0}RHO(3.2)$ samples, from Comparative Examples 1-3 and Examples 4-6 were mixed with a 10-fold excess (mole % basis) of 1M ammonium chloride solution at 90° C. for at least 4 hrs. After mixing, the material was filtered. The ammonium chloride mixing (exchange) was repeated 8 times to fully convert the material to the ammonium-exchanged RHO(3.2). After filtering, the material was rinsed 3 times with a 3-fold excess (weight % basis) of DI water and was dried overnight at 90° C. Typically, 75 g of the ammonium-exchanged RHO(3.2) was placed in a ceramic dish and calcined in a purged Fisher Scientific muffle furnace. While the oven was purged with ambient air at 5 L/min, the material was heated at a rate of 0.8° C./min in dry air or nitrogen to 550° C. and calcined at this temperature for 24 hrs to prepare the proton-exchanged RHO composition. Solid State $^{29}Si$ NMR demonstrated that some de-alumination had occurred during calcination, leading to a Si/Al of 3.5. Adsorption data for various HRHO(3.5) samples are shown in Table 2.

TABLE 3

| | Zinc Exchange of NaRHO(3.2) | | | | | | | |
|---|---|---|---|---|---|---|---|---|
| # of Zinc Exchanges | Na wt % | Zn wt % | Al wt % | Si wt % | Formula | $O_2\ P_{max}$ Torr\| (mmol/g) | $N_2\ P_{max}$ Torr\| (mmol/g) | $Ar\ P_{max}$ Torr\| (mmol/g) |
| 4 | 1.88 | 6.39 | 9.81 | 32.9 | $Zn_{3.1}Na_{2.6}H_{2.6}Si_{36.6}Al_{11.4}O_{96}$ | 58.6 (0.12) | 143.7 (0.29) | 52.0 (0.11) |
| 5 | 0.97 | 8.03 | 9.64 | 32.8 | $Zn_{3.6}H_{2.1}Na_{1.5}Si_{36.8}Al_{11.4}O_{96}$ | 70.0 (0.14) | 201.8 (0.41) | 68.8 (0.14) |
| 5 | 1.39 | 8.96 | 11.0 | 35.3 | $Zn_{3.9}H_{2.1}Na_{1.5}Si_{36.6}Al_{11.4}O_{96}$ | 55.6 (0.12) | 160 (0.34) | 51.9 (0.11) |

What is claimed is:

1. A method of making a RHO zeolite, the method comprising the steps of:
   forming a gel comprising $SiO_2$, $Al_2O_3$, $Na_2O$, $Cs_2O$, and $H_2O$, wherein the $SiO_2:Al_2O_3$ molar ratio is from 10.4 to 11.2, the $(Na_2O+Cs_2O):SiO_2$ molar ratio is from 0.3 to 0.4, and the $H_2O:SiO_2$ molar ratio is from 7.0 to 9.0;
   aging the gel by maintaining the gel at a temperature of from 20 to 30° C. for a period of from 1 to 5 days; and
   crystallizing and separating the aged gel into a crystallized NaCsRHO zeolite precipitate and a mother liquor by heating the aged gel to a temperature of from 85 to 105° C. and maintaining the gel at a temperature of from 85 to 105° C. for a period of from 3 to 5 days.

2. The method of claim 1, wherein the gel does not contain 18-crown-6.

3. The method of claim 1, wherein the gel does not contain any organic templating agents.

4. The method of claim 1, wherein the $SiO_2:Al_2O_3$ molar ratio of the gel is from 10.6 to 11.0.

5. The method of claim 1, wherein the gel is aged for a period of from 1 to 2 days.

6. The method of claim 1, wherein the aged gel is crystallized and separated by heating the aged gel to a temperature of from 90 to 100° C. and maintaining the gel at a temperature of from 90 to 100° C. for a period of from 3 to 5 days.

7. The method of claim 1, wherein the method further comprises the steps of:
   filtering the crystallized NaCsRHO zeolite from the mother liquor;
   washing the crystallized NaCsRHO zeolite with water; and, optionally
   drying the crystallized NaCsRHO zeolite.

8. The method of claim 7, wherein the method further comprises exchanging some or all of the $Na^+$ and $Cs^+$ cations in the filtered, washed, and optionally dried NaCsRHO zeolite with other cations.

9. The method of claim 8, wherein the $Na^+$ and $Cs^+$ cations in the filtered, washed, and optionally dried NaCsRHO zeolite are exchanged with $NH_4^+$ cations to provide an $(NH_4)$RHO zeolite; optionally some or all of the $NH_4^+$ cations in the $(NH_4)$RHO zeolite are then exchanged with $Na^+$ and/or $Ca^{2+}$ cations; and then some or all of the $NH_4^+$, $Na^+$ and/or $Ca^{2+}$ cations in the zeolite are exchanged with $Zn^{2+}$ and/or $Li^+$ cations to provide a zinc-exchanged and/or lithium-exchanged RHO zeolite.

10. The method of claim 7, wherein the crystallized NaCsRHO zeolite is filtered via vacuum or pressure filtration.

11. The method of claim 7, wherein the crystallized NaCsRHO zeolite is washed until a ratio of 5 g of suspended RHO product per 100 mL of water has a pH of from 9 to 11.

12. The method of claim 1, wherein the gel does not contain any organic compounds.

13. The method of claim 1, wherein the gel is formed by mixing at a temperature of from 20 to 30° C. water and sources of silica, alumina, sodium, and cesium.

* * * * *